US008649783B2

(12) United States Patent
Roundtree et al.

(10) Patent No.: US 8,649,783 B2
(45) Date of Patent: Feb. 11, 2014

(54) NO-COST MOBILE DEVICE MESSAGING, SUCH AS FOR PROVISIONING AN APPLICATION ON A MOBILE DEVICE

(75) Inventors: Brian Roundtree, Kirkland, WA (US); Tim Shelton, North Bend, WA (US); Gordon Waddell, Seattle, WA (US); Pim van Meurs, Kenmore, WA (US); Jon Witort, Berkeley, CA (US); Torsten Zeppenfeld, Emerald Hills, CA (US)

(73) Assignee: Nuance Communications, Inc., Burlington, MA (US)

( * ) Notice: Subject to any disclaimer, the term of this patent is extended or adjusted under 35 U.S.C. 154(b) by 623 days.

(21) Appl. No.: 12/888,322

(22) Filed: Sep. 22, 2010

(65) Prior Publication Data

US 2012/0071152 A1 Mar. 22, 2012

(51) Int. Cl.
*H04M 3/00* (2006.01)

(52) U.S. Cl.
USPC ........... 455/418; 455/419; 455/420; 455/561; 370/328

(58) Field of Classification Search
USPC ....................... 455/418–419, 435.1
See application file for complete search history.

(56) References Cited

U.S. PATENT DOCUMENTS

| 7,062,260 | B2 * | 6/2006 | Vuori | 455/418 |
| 7,353,016 | B2 | 4/2008 | Roundtree et al. | |
| 7,752,292 | B1 * | 7/2010 | Katzer | 455/419 |
| 7,826,834 | B2 * | 11/2010 | Hook et al. | 455/420 |
| 8,081,596 | B1 * | 12/2011 | Buracchini et al. | 455/419 |
| 2002/0002605 | A1 * | 1/2002 | Honda | 709/219 |
| 2004/0242209 | A1 * | 12/2004 | Kruis et al. | 455/419 |
| 2006/0195840 | A1 * | 8/2006 | Sundarrajan et al. | 717/176 |
| 2007/0293221 | A1 * | 12/2007 | Hwang et al. | 455/435.1 |
| 2008/0189550 | A1 | 8/2008 | Roundtree | |
| 2012/0021733 | A1 * | 1/2012 | Lin et al. | 455/418 |

OTHER PUBLICATIONS

3rd Generation Partnership Project, "Definition of Access Point Name," Chapter 9, from 3GPP TS 23.003 V8.0.0, 2008, 8 pages.
Wikipedia.org, "GPRS Core Network," revised Jul. 19, 2009, 6 pages.

* cited by examiner

*Primary Examiner* — Charles Appiah
*Assistant Examiner* — Randy Peaches
(74) *Attorney, Agent, or Firm* — Perkins Coie LLP

(57) ABSTRACT

An application stored in a mobile device is provisioned using provisioning data received from remote data storage via a network. Provisioning data is obtained at no cost to a user of the mobile device. In some implementations, the provisioning data is received after the mobile device requests to establish a data channel with a data network. The data network is identified using a predetermined identifier that the network recognizes. If the network does not recognize the special identifier, no data channel is established. After a data channel is established, the mobile device requests provisioning data from the remote data storage. In some implementations, the mobile device receives a provisioning message through a predetermined port. The provisioning message either includes provisioning data or prompts the mobile device to obtain provisioning data.

14 Claims, 8 Drawing Sheets

ND-COST MOBILE DEVICE MESSAGING, SUCH AS FOR PROVISIONING AN APPLICATION ON A MOBILE DEVICE

BACKGROUND

A mobile device, such as a cellular phone, typically includes a number of software applications when it is sold to a consumer. Many of the included applications function upon turning on the mobile device without support or data from external systems. For example, a calculator program on a mobile device will need no additional information from a server to be able to multiply two inputted numbers. On the other hand, some applications cannot operate without first receiving data or instructions from remote systems. For example, a customer care application for a cellular service provider might require billing information pertaining to a customer, and it might need to be instructed regarding how to obtain this data.

An application might be shipped without such important information for a variety of reasons. One reason is if an application requires data from a service provider and it would have been impractical for the application to be shipped knowing how to obtain this data. For example, the customer care application mentioned above may be loaded on all open market handsets that are manufactured by a specific handset manufacturer, and the open market handsets can be activated on any of a number of different cellular networks. As a result, the customer care application on a particular open market handset might not be configured to receive billing data from a cellular network that the handset is activated on because the customer care application would have been loaded on the handset before it was known which network the handset would connect to. Although most existing mobile devices are configured to receive this needed data through a data connection, it is important that they obtain the data and/or determine whether it is available without incurring a charge for the customer, particularly when a cellular network that the mobile device is activated on does not even support the application that needs to be provisioned.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 2 is a system diagram illustrating elements of a General Packet Radio Service network that a system for provisioning an application on a mobile device may operate in.

DETAILED DESCRIPTION

Overview

Figure 1:
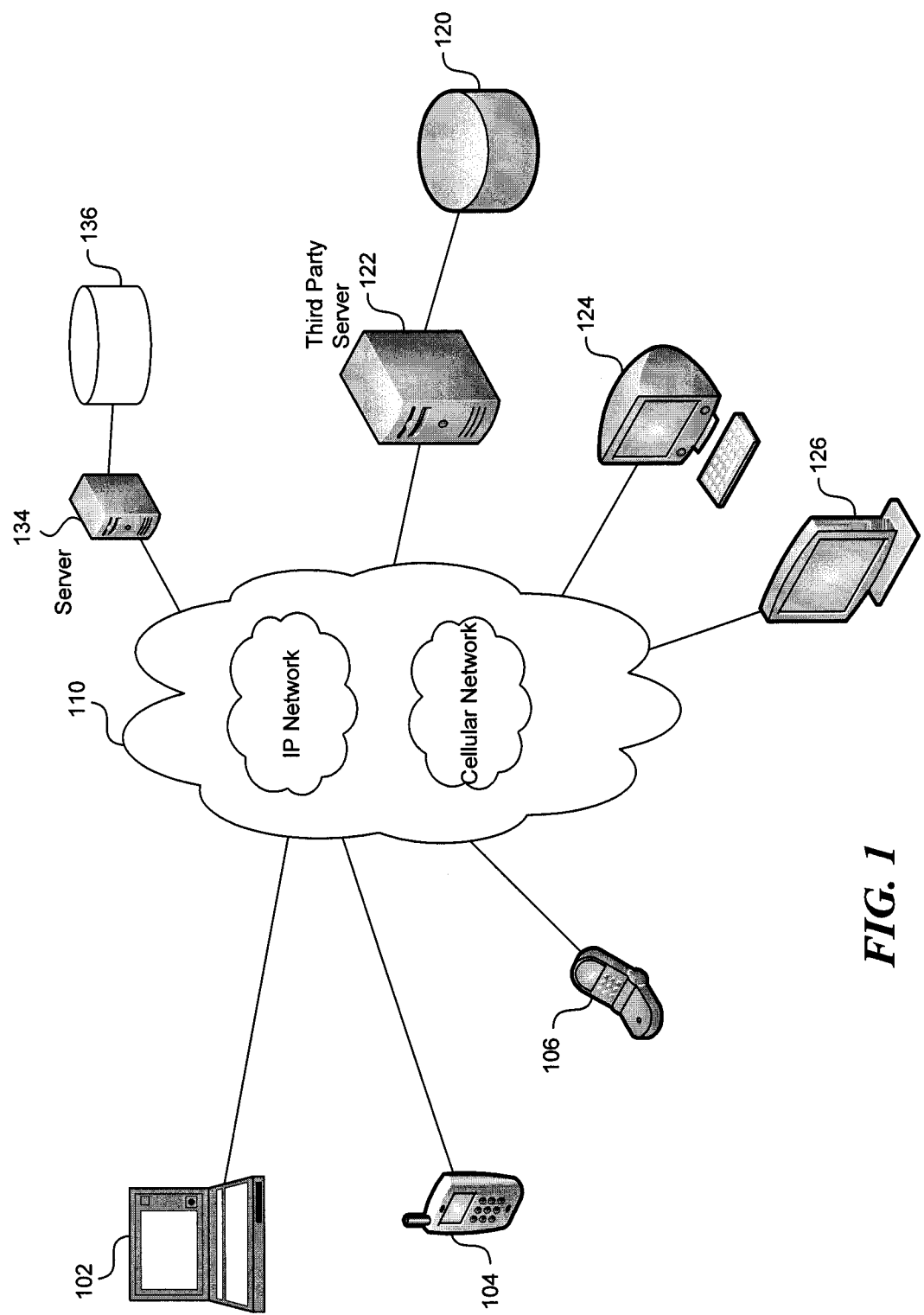
FIG. 1 is a system diagram illustrating a representative environment for implementing aspects of the invention.

The present disclosure is directed to permitting no-cost mobile device messaging and to provisioning an application on a mobile device. As discussed below, the mobile device provisions the application using provisioning data that it receives from data storage via a network, where provisioning data can include data that configures an application, is executed to create an application, and the like.

The present disclosure is useful in a number of scenarios. In one example, a company loads a customer care application or other applications onto all cellular phones that are produced by a particular manufacturer. Users who buy these phones can activate them on any of a number of different networks. However, the customer care application cannot function properly without billing or other data from an operator of the network that the phone is activated on. The company cannot configure the application to operate with the network's systems because the company does not know which network the phone will be activated on or whether the network that it is activated on will even support the customer care application. The present disclosure allows the phone to check whether the network supports the application and whether data to configure the application is available. This check may be performed using messages that the network will not charge for because the messages are typically initial protocol signals used to establish a data connection. If the network does not support the application, no connection will be made and the user will not be charged. If the network does support the application, the phone can download provisioning data from the network that can be used to configure the application. This automatic check for provisioning data is done without incurring user charges.

As described in the previous example, the mobile device may determine whether provisioning data is available by exploiting a process of establishing a data channel between the mobile device and a data network, but without necessarily establishing the channel—just exchanging messages for the initial set-up of the channel. For example, after connecting with a wireless network, the mobile device can request to resolve a data channel for communicating with a data network represented by a special identifier. When the network receives this request from the mobile device, and the network recognizes the special identifier, the network can establish a data channel between the mobile device and a data network. When this data channel is established, the mobile device can infer that provisioning data is available through the network because the network recognized the special identifier and established the data channel. Consequently, the mobile device can request that data storage coupled to the network send it provisioning data. If, on the other hand, the network does not recognize the special identifier, the network will not resolve a data channel between a data network and the mobile device. In this instance, the mobile device can infer that provisioning data is not available through the network because the network did not recognize the special identifier. Since the mobile device determines whether provisioning data is available by requesting a data channel, but not opening a data channel, a user of the mobile device will incur no charges.

For example, after the mobile device connects to the network, it determines whether the network includes data for provisioning an application stored locally on the mobile device. The mobile device is able to establish whether this data is available without incurring a charge for a user of the mobile device by exploiting signaling in existing wireless protocols. Instead of using a standard data connection to query the network about provisioning data, the mobile device determines whether provisioning data exists on the network using signals that are transferred between it and the network to resolve or establish a data channel between the mobile device and a data network. As discussed below, in the GPRS network environment, the mobile device is able to determine whether provisioning data exists on the GPRS network, at no cost to the user, by utilizing the PDP activation processes and a special APN to leverage the GGSN discovery process detailed in the GPRS/GSM specification.

As an alternative to the mobile device initially sending a signal, the mobile device receives a message from the network that either contains provisioning data or prompts the mobile device to obtain provisioning data. For example, if the mobile device is connected to a network, such as a cellular network, a server or another network element can send a data message to the mobile device. The message instructs the mobile device to provision an application. If the mobile device has the application that needs provisioning, the mobile device will recognize the message as a provisioning message.

The mobile device may receive numerous provisioning messages. The application needing to be provisioned may specify a port through which the mobile device will receive a provisioning message. If the mobile device does not have the application that needs to be provisioned, it will disregard a message received through that port and a user of the mobile device will incur no charges for the message. If the mobile device does have the application needing to be provisioned, the mobile device will recognize the message received through the specified port as a provisioning message.

If the provisioning message contains provisioning data, the mobile device can use the provisioning data to provision the application. If the provisioning message does not contain provisioning data, the mobile device can request provisioning data from the network. For example, in some implementations, the provisioning message contains a network address of a server that stores provisioning data. The mobile device can request provisioning data from the server and use the provisioning data to provision the application.

The mobile device provisions the application by configuring or altering the application, by providing additional data or instructions that the application can access, or by otherwise changing how the application functions. In some implementations, an application needing to be provisioned only comprises instructions and data for obtaining provisioning data. In such an implementation, the provisioning data comprises the entire application that is executed on the mobile device, and provisioning the application comprises installing the application on the mobile device. For example, the application needing to be provisioned can be an installation application that instructs the mobile device how to download and install a program. In other implementations, an application needing to be provisioned comprises data and instructions for operating but lacks configuration settings that would allow it to operate within a given system, and provisioning data for the application comprises the configuration settings that would allow it to operate within the system. In such an implementation, the mobile device can provision the application by downloading and incorporating the configuration settings into the application. The provisioning data may also comprise a script, such as a java script or an executable file that provisions an application, a key, or data or instructions that the mobile device uses to modify an application needing to be provisioned.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Description

The following discussion provides a brief, general description of a representative environment in which the invention can be implemented. Although not required, aspects of the invention may be described below in the general context of computer-executable instructions, such as routines executed by a general-purpose data processing device (e.g., a server computer, a personal computer, or mobile/portable device). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," "mobile device," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in the example of FIG. 1, mobile devices 104 and 106, such as a phone, may wirelessly communicate with one or more networks 110. The term "mobile device," as used herein, may be a cell phone, a personal digital assistant (PDA), a portable email device (e.g., a Blackberry® device), a portable media player (e.g., an Apple IPod Touch®), a tablet or slate computer (e.g., an Apple iPad®), a netbook computer, a notebook computer, an e-reader, or any other device having wireless communication capability. The network 110 may be any type of cellular, IP-based, converged or other telecommunications network, etc., such as Global System for Mobile Communications (GSM), Code Division Multiple Access (CDMA), General Packet Radio Service (GPRS), Orthogonal Frequency Division Multiple Access (OFDMA), Worldwide Interoperability for Microwave Access (WiMAX), Voice over Internet Protocol (VoIP), Unlicensed Mobile Access (UMA), wireless fidelity (WiFi), any of the IEEE 802.11x protocols, etc. The network 110 communicates with the mobile devices 104, 106 via one or more cellular transceivers or base station antennas (in cellular implementations), access points, terminal adapters, routers or modems (in IP-based telecommunications implementations), combinations of the foregoing (in converged network embodiments), or via other wireless transceivers. Although aspects of the invention, such as certain functions, are described as being performed by the network 110, it will be understood that these aspects may be performed by components communicating with the network, such as computers that are coupled to the network.

Although mobile devices 104 and 106 are generally described under examples provided below, aspects of the invention apply equally to any communication device, such as laptops 102, or more stationary computing devices such as personal desktop computers 124, or another device, such as a television, set-top box, electronic picture frame, electronic reading device, etc. or a similar display device 126.

In some implementations, the mobile device 104, 106 transmit data, such as queries for data to provision an application, to or from a network element via the network 110. Upon receiving the data, the network 110 routes the data to the mobile device or network element. In an illustrative example, data for provisioning an application may be stored in and received from a database 136 associated with a server 134 that is operated by an operator of the network, or it may be stored in a third-party database 120 associated with a third-party server 122.

Provisioning data stored in data storage devices 120, 136 may be received via the personal computer 124 via a WiFi, infrared, Bluetooth, cellular telephone, or other wireless link, or by connecting the computer via USB or other wired link to the network 110. Thus, while data transfer is described at times herein as using a wireless connection, such as through the mobile device 104, 106, any communications interface or connection may be used to transfer provisioning data, including any of the wireless and wired connections noted herein, as well as others.

Figure 2:
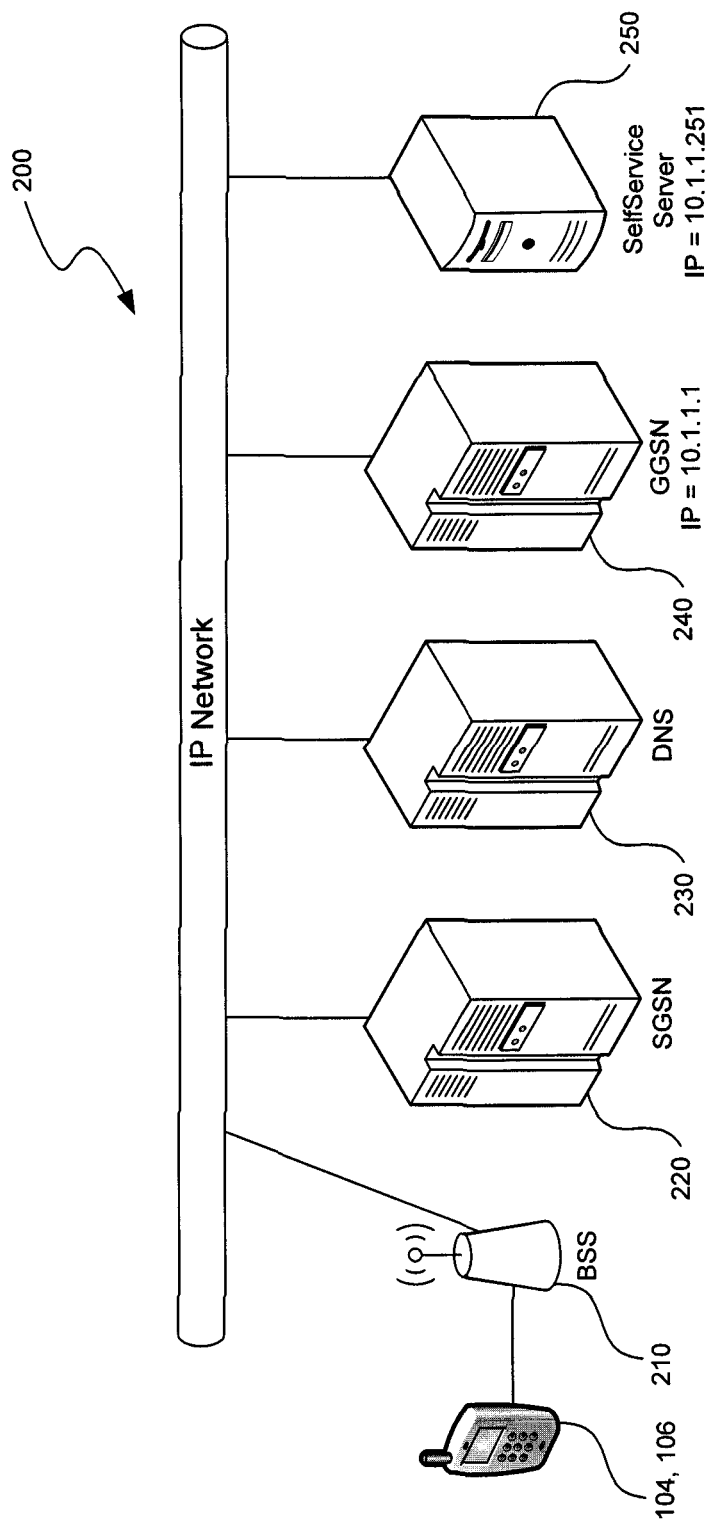

FIG. 2 is a diagram illustrating elements of a GPRS network 200 in which a system for provisioning an application on a mobile device can operate. The mobile device 104, 106 communicates wirelessly with a base station subsystem (BSS) 210, which typically comprises a base transceiver station (BTS) and a base station controller (BSC). The BSS 210 is configured to handle traffic and signaling between the mobile device 104, 106 and the GPRS network. The GPRS network includes a Serving GPRS Support Node (SGSN) 220, a Domain Name System (DNS) server 230, a Gateway GPRS Support Node (GGSN) 240, and a Self Service Server 250. The SGSN 220 routes and transfers data packets from and to the mobile device 104, 106 via the BSS 210. The SGSN 220 is configured to route DNS queries and replies and to send and receive packet data protocol (PDP) context requests and responses. The DNS server 230 is configured to receive a DNS query identifying an Access Point Name (APN) and to reply to the query with an IP address of the packet data network (PDN) represented by the APN.

The GGSN 240 routes data packets from external networks to the SGSN 220, which are then routed to the mobile device 104, 106. The GGSN 240 also converts GPRS packets coming from the SGSN into appropriate PDP format and sends them to a corresponding packet data network. The GGSN 240 can convert PDP addresses of incoming data packets to a GSM address of a mobile device 104, 106. The GGSN 240 is also configured to send Dynamic Host Configuration Protocol (DHCP) requests to a DHCP server and receive DHCP replies.

The SelfService Server 250 is coupled to data storage areas that store provisioning data. The SelfService Server 250 can be operated by an operator of the GPRS network 200 or it can be operated by a third party. For example, the SelfService Server can correspond to the server 134 or third party server 122.

Mobile

Figure 3:
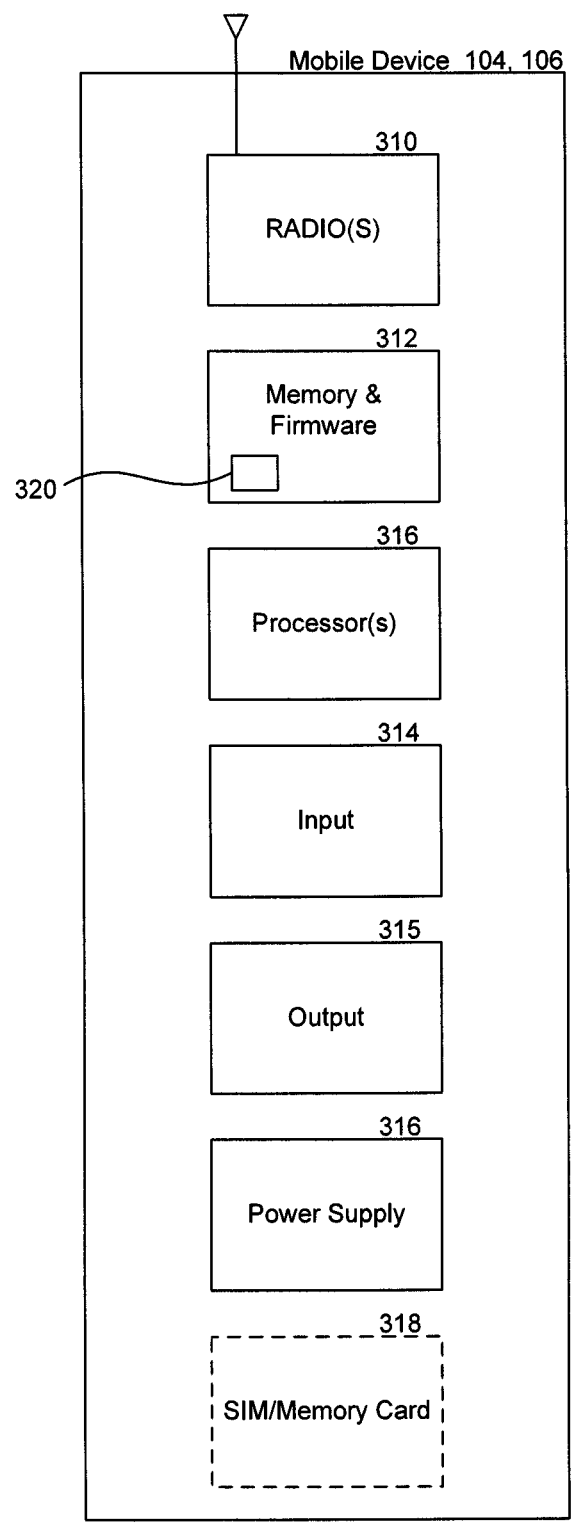
FIG. 3 is a block diagram illustrating a mobile device.

FIG. 3 is a block diagram of the mobile device 104, 106 according to some implementations. The mobile device 104 includes a mobile communication component, such as one or more wireless transceivers or radios 310, a memory and firmware 312, input components 314, and output components 315, which all communicate with one or more processors 316. The input components 314 of the mobile device 104, 106 may include a microphone, user input buttons (physical or via a touch screen), as well as other components, such as a global positioning system (GPS), a digital camera, a wireless LAN (WiFi) interface, a motion sensor, a Bluetooth® interface, USB or similar port, and so forth. The output components 315 may include a speaker, headphone or headset jack adapter, visual display, haptic output device (e.g., a vibrator), as well as the communication elements noted above as input components. For example, the BlueTooth® interface may communicate with an external wireless communications component, such as a wireless headset, to not only receive audio input, but also provide audio output.

The communication component can include a GSM radio, as well as a WLAN, and/or personal area network (PAN) radio, such as one employing IEEE 802.11, Bluetooth or other wireless standards. The processors in the mobile device 104, 106 can include components for facilitating voice and data calls, processing images, executing firmware, as well as processors for performing actions described herein. Indeed, as an alternative, or in addition to the processor(s), the mobile device 104, 106 may include one or more digital signal processors (DSPs), application-specific integrated circuits (ASICs), field programmable gate arrays (FPGAs), or other logic/data processing circuitry.

In some instances, the mobile device 104, 106 may include a removable card slot to receive a Subscriber Identity Module (SIM) and/or a removable memory card 318 that may itself include a processor, memory, radio, etc. The removable memory card is received within a card slot of the mobile, and can be of a form and shape common to any known cards, such as SD cards, xD cards, PCMCIA cards, etc. Further, the mobile may include other memory, such as a cache memory for temporarily storing information.

Mobile device 104, 106 includes an operating system (OS), which is resident in the memory 312 and which is executed by the processor 316. One or more application programs may be loaded into the memory 312 and are run by or in conjunction with the OS. Examples of application programs 312 include conventional phone application programs, such as address book/phonebook/contacts programs, as well as game programs, navigation programs, installation wizard programs, customer care applications, email programs, scheduling programs, PIM (personal information management) programs, word processing programs, spreadsheet programs, Internet web browser programs, games, media playback programs, etc. Any application program or the OS can be provisioned according to implementations of the invention.

The memory 312 can include a mobile provisioning component 320, which can include an application needing to be provisioned and/or instructions for provisioning the application. As described herein, in some implementations, the application and/or the instructions for provisioning the application include a special identifier that the mobile device can use to determine whether provisioning data exists on a network. In other implementations, the application and/or the instructions for provisioning the application include logical addresses or the number of a port through which the mobile device might receive a provisioning message.

Mobile device 104, 106 also includes a power supply 316, which can be implemented as one or more batteries. The power supply 316 may further include an external power source, such as an AC adapter or a powered docking cradle for supplementing or recharging the batteries. Of course, other power supplies may be employed, such as solar cells, transducers for generating electricity for motion, fuel cells, bio-electric or temperature transducers to generate electricity and store it in a rechargeable battery/capacitor, and so forth.

While various components, features, and functions of the mobile device 104, 106 have been described in the implementation illustrated in FIG. 3, it should be understood that numerous other configurations, components, features, and the like may be incorporated into the mobiles described herein, and that the implementations described herein are not limited to any particular configuration for the mobiles.

Provisioning System

Figure 4:
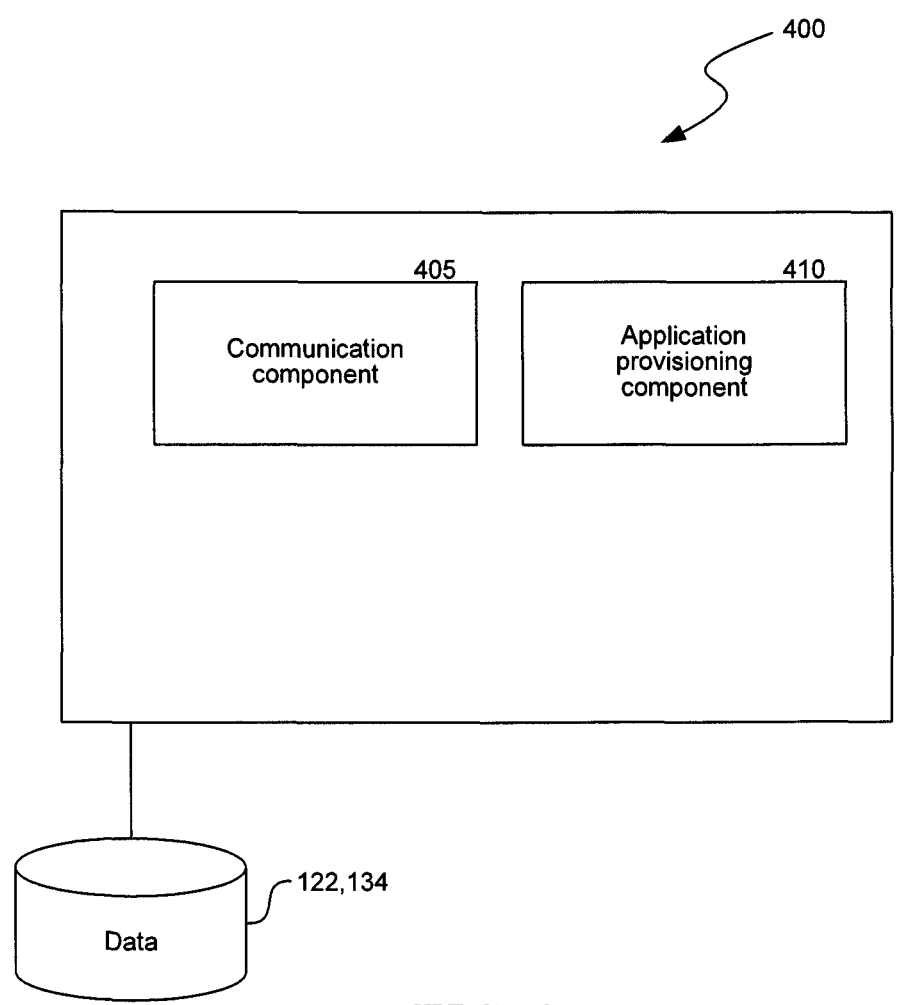
FIG. 4 is a block diagram of a representative system for provisioning an application on a mobile device.

FIG. 4 is a block diagram of a network system 400 for provisioning an application on the mobile device 104, 106. The system 400 includes a communication component 405 and an application provisioning component 410. In the examples described below, the system 400 operates in the GPRS network 200. The system 400 can access data stored in data storage 122, 134. This data may include, for example, data for provisioning an application, instructions for provisioning an application, a special identifier for identifying when a mobile device is requesting provisioning data, data identifying mobile devices that include an application needing to be provisioned, and so on.

The communication component 405 is configured to send and receive signals to and from the mobile device 104, 106 via the network. The communication component 405 is also configured to establish a data channel between the mobile device and a data network. In some implementations, the mobile device initiates the process by which an application is provisioned. For example, an application needing to be provisioned may cause the mobile device to send a request to the system 400 for provisioning data. Alternatively, the system 400 initiates the provisioning of an application stored in the mobile device by sending a message to the mobile device, such as by sending a binary SMS message. As such, the communication component 405 is configured to receive data from the mobile device including requests from the mobile device to provision an application. The communication component 405 is also configured to send provisioning data to the mobile device and messages to the mobile device indicating the system's ability to provision an application.

The application provisioning component 410 is configured to access provisioning data from data storage 122, 134. The application provisioning component 410 is also configured to compare a special identifier received from the mobile device to a data stored in data storage 122, 134.

Provisioning an Application

Figure 5:
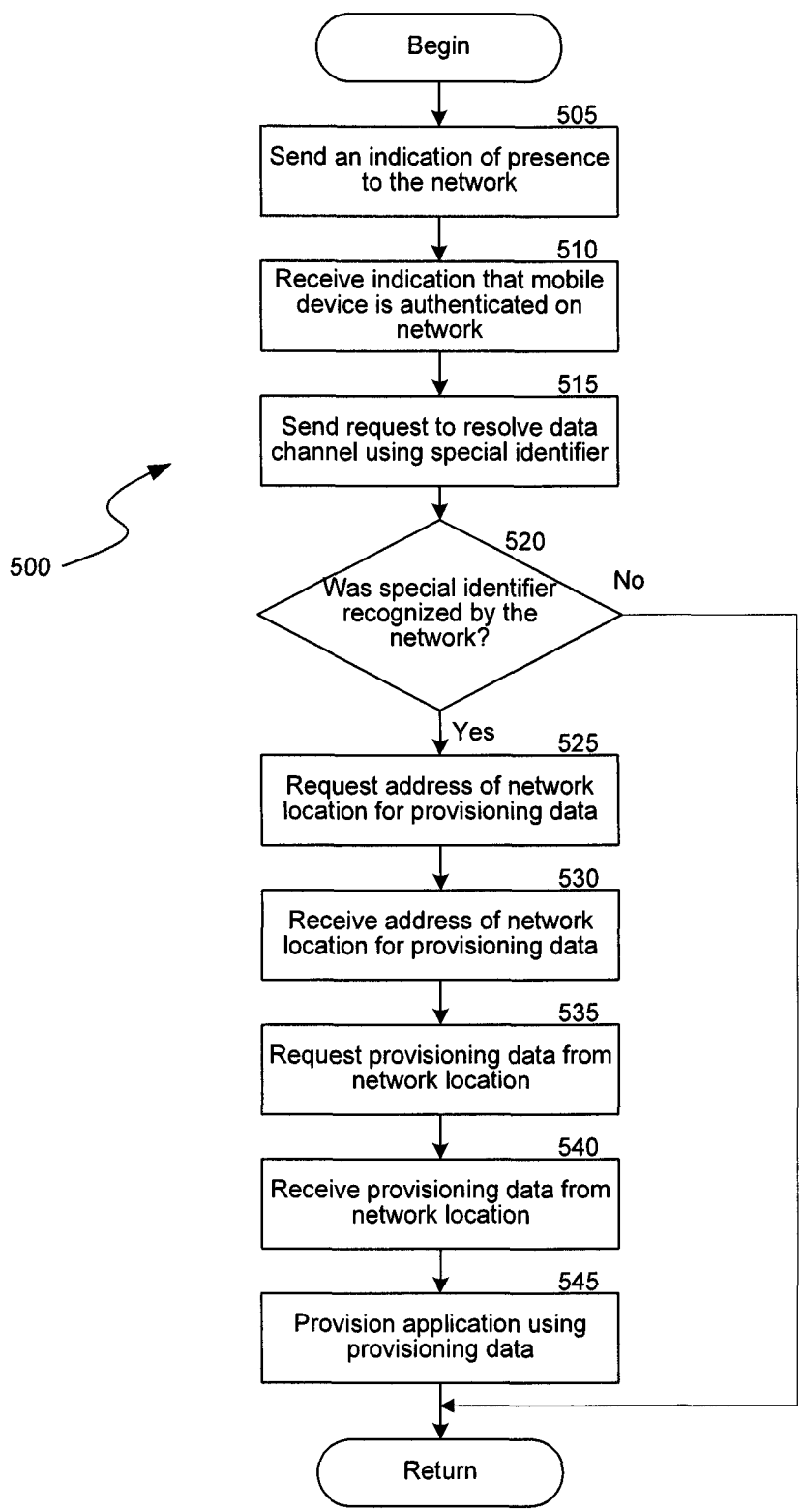
FIG. 5 is a flow diagram depicting an example of a routine to provision an application on a mobile device.

FIG. 5 is a flow diagram depicting an example of a routine 500 for provisioning an application on the mobile device 104, 106. In some implementations, the application needing to be provisioned includes instructions for executing the routine 500 or portions thereof. In some implementations, the routine 500 is initiated when the mobile device 104, 106 is powered on. In some implementations, the routine commences when a SIM card is inserted into the mobile device, when the mobile device is able to detect a signal from the network 110, when the mobile device is no longer roaming, when the mobile device is restarted, or at another time.

Figure 6:
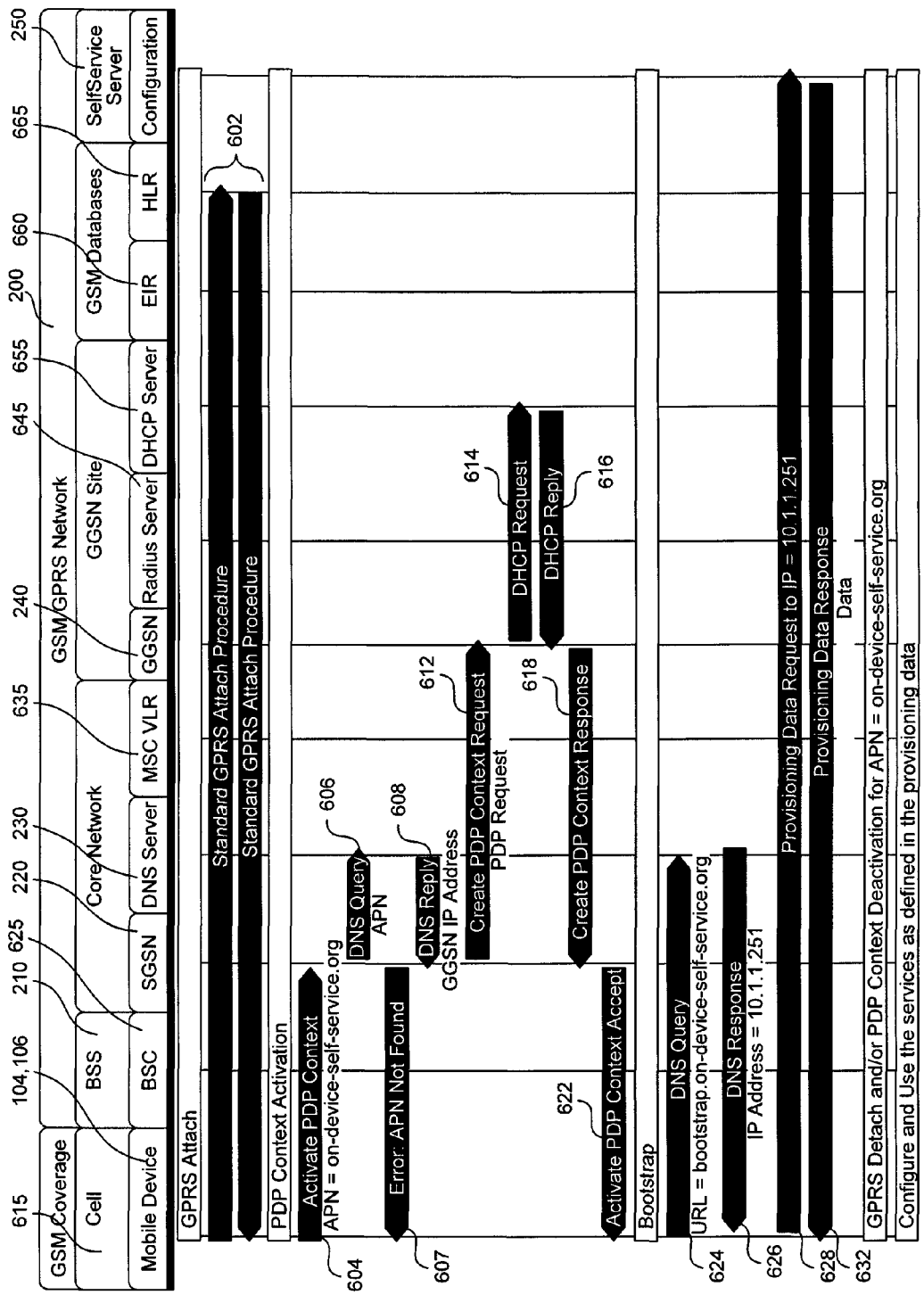
FIG. 6 is a signaling diagram illustrating communication between various elements of a General Packet Radio Service network for provisioning an application.

The mobile device receives data to provision the application via the network 110 from data storage 122, 134. To connect to the network, at a block 505, the mobile device sends an indication of its presence to the network 110. For example, the mobile device can broadcast data identifying itself on a predetermined communication channel that the network uses for signaling. If the network recognizes the mobile device, at a block 510, the mobile device receives an indication that it has been authenticated on the network 110. In the GPRS network 200, a mobile device can be authenticated using a standard GPRS attach procedure. FIG. 6 is a signaling diagram depicting communication between various elements of the GPRS network 200 for transferring provisioning data to the mobile device 104, 106. The GPRS network includes the BSS 210, the SGSN 220, the DNS server 230, the GGSN 240, and the SelfService server 250. The mobile device 104, 106 connects to the GPRS network via a cell 615 of a base transceiver station. The GPRS network may also include a BSC 625, a mobile switching center (MSC) visitor location register (VLR) 635, a radius server 645, a DHCP server 655, an equipment identity register 660, and a home location register (HLR) 665. The HLR includes data storage having mobile device information stored therein, including data specifying which mobile devices are authorized to use the GPRS network. During a standard GPRS attach procedure 602, the GPRS network compares data from the HLR to data identifying the mobile device 104, 106 to determine whether the mobile device is authorized to use the network.

Returning to FIG. 5, after the mobile device is authenticated on the network, at a block 515, the mobile device requests that the network establish a data channel for communication between the mobile device and a data network that is represented by a special identifier. The application needing to be provisioned can specify the special identifier, which can include a name, a network address, or the like. If the network has provisioning data for the application, it will recognize the special identifier. The network does not actually need to have a special data network that is represented by the special identifier. Instead, it can route a request to establish a data channel between the mobile device and a data network represented by the special identifier so that a data channel is established between the mobile device and an existing data network.

If the network does not recognize the special identifier, it will not resolve a data channel for communication between the mobile device and the data network. No charges will be levied on the user when no data channel is resolved. In the GPRS network environment of FIG. 6, the special identifier is represented by an APN, and the mobile device attempts to resolve a data channel by activating a PDP context 604 with a PDN represented by the APN. In FIG. 6, the APN identified by the mobile device is "on-device-self-service.org." Activating a PDP context causes the SGSN 220 to query the DNS server 230 for an IP address corresponding to on-device-self-service.org. A user of the mobile device incurs no charges for this DNS query 606 because the PDP context has not yet been established and the SGSN—and not the mobile device—queries the DNS server 230. As a result, the user receives no charges when the mobile device attempts to provision an application but is unable to.

At a decision block 520, the mobile device determines whether the special identifier was recognized by the network. If the network does not recognize the special identifier, it has no provisioning data to send the mobile device so the routine 500 ends. In some implementations, the mobile device will receive an indication from the network that the special identifier was not recognized. In other implementations, the mobile device concludes that the special identifier was not recognized when it does not receive a response from the network after a certain time period has elapsed since requesting to establish a data connection with the data network represented by the special identifier. However, in some implementations, the routine 500 starts over when no response is received from the network. In the GPRS network environment, the SGSN transmits an error message 607 to the mobile device when the APN specified by the mobile device is not found.

When the network recognizes the special identifier, the network resolves a data channel for communication between the mobile device and the data network associated with the special identifier. As mentioned above, in some implementations, the network routes requests specifying the special identifier so that a data channel is established for communication between the mobile device and a standard data network coupled with the network 110. For example, in the GPRS network environment, the APN recognized by the GPRS network is associated with an IP address, which can also be the IP address that corresponds to a standard GGSN in the network. Thus, when the network identifies the APN specified by the mobile device, the DNS server 230 sends a DNS reply message 608 to the SGSN 220 identifying an IP address for the GGSN 240. The SGSN 220 sends a request 612 to create a PDP context to the GGSN 240 represented by the IP address. The GGSN 240 sends a DHCP request 614 to the DHCP server 655, which sends a DHCP reply 616 to the GGSN 240. The GGSN 240 sends a response 618 to the SGSN's request to create a PDP context, and the SGSN sends an indication 622 to the mobile device that the PDP context has been activated.

Returning to FIG. 5, once the network has resolved a data channel for communication between the mobile device and the data network, the mobile device can request provisioning data. At a block 525, the mobile device requests certain information, such as an address of the network location from which the mobile device may receive the provisioning data. For example, the provisioning data may be stored in data storage coupled to the SelfService server 250, and the application needing to be provisioned may include a uniform resource locator (URL) corresponding to the SelfService Server 250. The mobile device can request a network address that corresponds to the URL of the SelfService Server 250. Referring again to FIG. 6, in the GPRS network environment, the mobile device sends a DNS query 624 to the DNS server 230 requesting an IP address for a URL, "bootstrap.on-device-self-service.org," which corresponds to the SelfService Server 250.

At a block 530, the mobile device receives the address of the network location for the provisioning data. In some implementations, the address is an IP address. For example, returning again to FIG. 6, the DNS server sends a response 626 to the mobile device that includes an IP address for the provisioning data (i.e., 10.1.1.251). At a block 535, the mobile device requests the provisioning data from the network address received at block 530. In the GPRS network environment, the mobile device sends a request 628 for provisioning data to the IP address received in the DNS response 626, which corresponds to the SelfService Server 250.

At a block 540, the mobile device receives the provisioning data from data storage coupled with the network location. For example, in the GPRS network environment, the SelfService server 250 transfers the provisioning data over the GPRS network to the mobile device. At a block 545, the mobile device provisions the application.

The routine 500 permits the mobile device to communicate with a fee-based network without incurring charges. A mobile device utilizes a special identifier specified by an application on the mobile device in requesting to establish a data channel with a network. As a consequence, no existing mobile devices have apparently interpreted a response from the network—expressing whether the special identifier specified by the application was recognized or not—to determine whether the mobile device should take a follow-up action with respect to the application.

Figure 7:
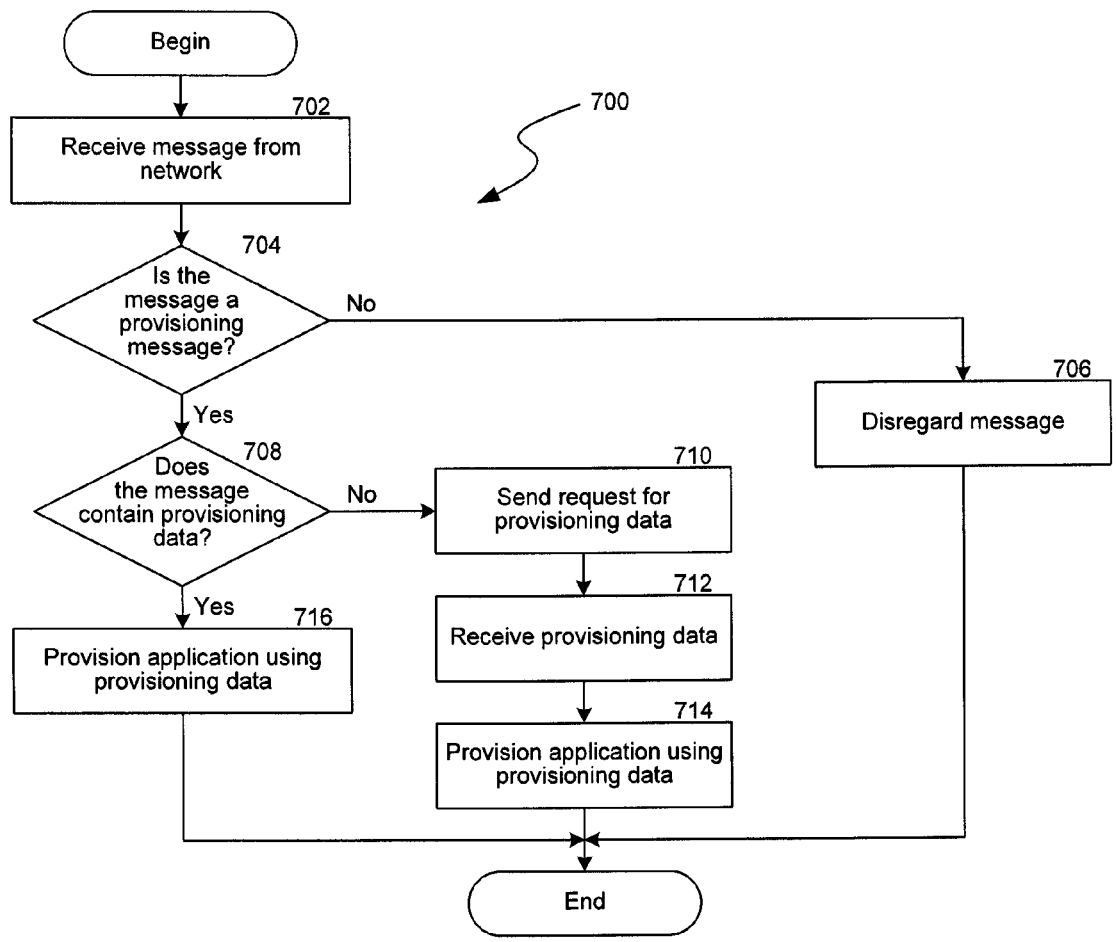
FIG. 7 is a flow diagram depicting an example of a routine to provision an application on a mobile device.

As an alternative to the mobile device initiating a process to obtain provisioning data, the network can trigger the mobile device to seek provisioning data. FIG. 7 is a flow diagram depicting an example of a routine 700 for provisioning an application on the mobile device 104, 106 according to another implementation. The routine 700 begins when the mobile device is connected to the network 110 and it receives a message or messages from the network. For example, the mobile device might receive a wireless datagram protocol (WDP) SMS message or a message using unstructured supplementary service data (USSD). When the mobile device receives multiple messages, it will wait until the last message before the routine 700 continues. In some implementations, the application is dormant prior to the mobile device receiving the message, and the mobile device activates the application when it receives the message.

At a decision block 704, the mobile device determines whether the message is a provisioning message. A provisioning message includes provisioning data for an application stored in the mobile device or instructions for obtaining provisioning data for the application. In some implementations, the mobile device recognizes that a message is a provisioning message when it is received through a predetermined port. For example, an application needing to be provisioned can specify that provisioning data will be sent to port 10810, allowing the mobile device to recognize that any message received through that port is a provisioning message. When the mobile device does not recognize the message as a provisioning message, at a block 706 the mobile device disregards the message and the routine 700 ends. For example, if the message was not received at port 10810, the mobile device can disregard the message. Similarly, if the mobile device does not include the application to be provisioned and it receives the message through port 10810, it will silently ignore the message.

If at the decision block 704, the mobile device concludes that the message is a provisioning message, the routine proceeds to a decision block 708, and the mobile device determines whether the provisioning message contains provisioning data. If the message contains provisioning data, at a block 716, the mobile device provisions the application using the provisioning data, and the routine 700 ends.

In some implementations, the message received by the mobile device is a user-readable message, such as a user-readable SMS message, that instructs a user of the mobile device to send a message to a particular destination to acquire provisioning data. Consequently, the mobile device acquires provisioning data after the user sends a message to the particular destination. In some implementations, the message includes signature data that the mobile device can use to verify the authenticity of the message. For example, the application may include data that can be compared to the signature data to determine whether the message was sent by a desired party, such as a service provider of the network. An example of such a security process is described in U.S. patent application Ser. No. 11/575,058.

If at decision block 708, the mobile device determines that the provisioning message does not contain provisioning data, at a block 710, the mobile device requests provisioning data from the network. In some implementations, the provisioning message includes instructions or data specifying how the mobile device can obtain provisioning data. For example, the provisioning message may include an IP address of a network location for provisioning data, and the mobile device may request provisioning data from the IP address. Similarly, in some implementations, the provisioning message specifies that the mobile device should send a message to a particular destination to request provisioning data. For example, the provisioning message might instruct the mobile device to automatically send a message such as an SMS message to a specific destination to request provisioning data.

After requesting provisioning data, at a block 712, the mobile device receives provisioning data. The provisioning data may be received in a message, such as an SMS message. The provisioning data may also be received via a data connection with the network. At a block 714, after receiving provisioning data, the mobile device provisions the application using the provisioning data, and the routine 700 ends.

Figure 8:
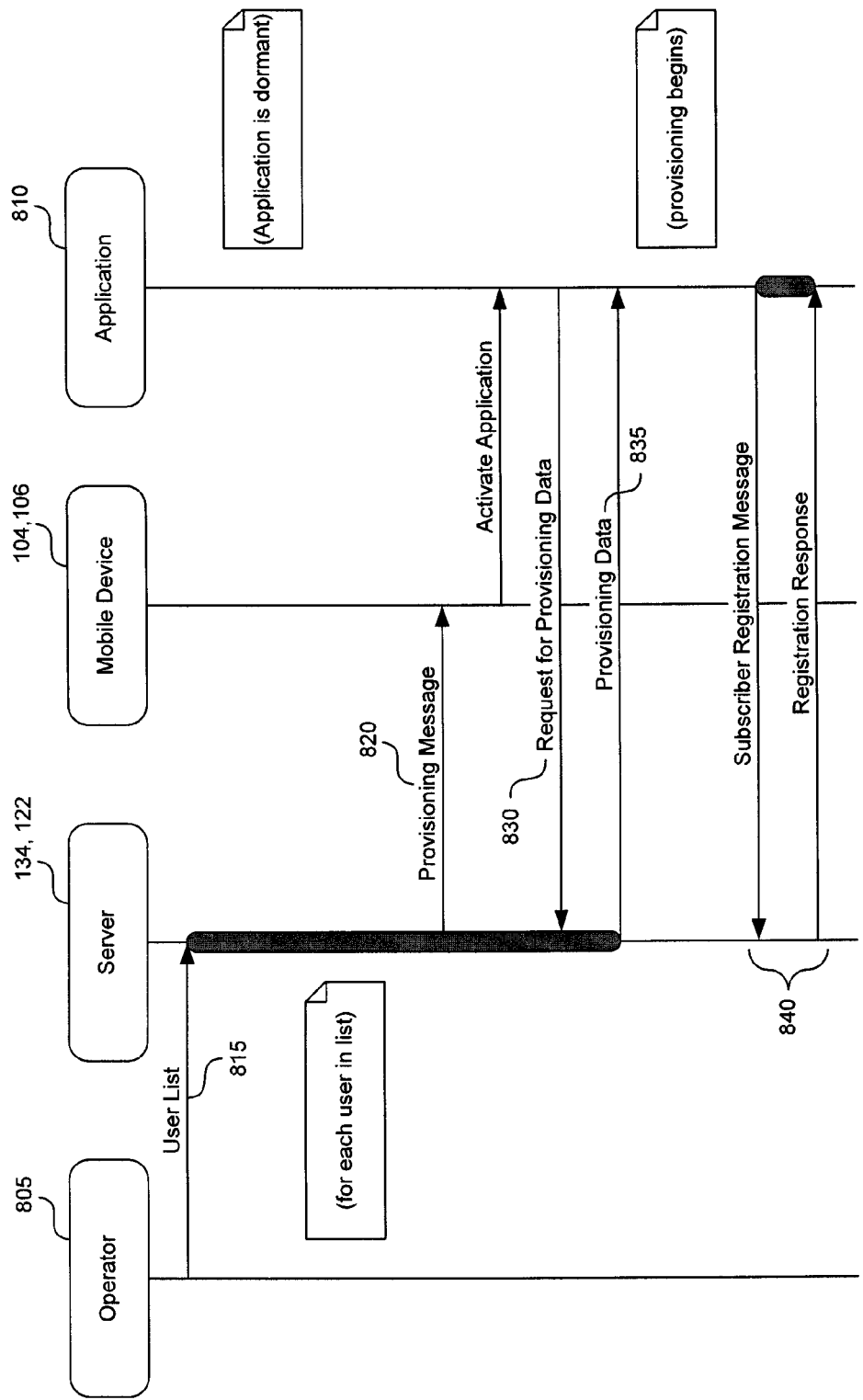
FIG. 8 is a diagram illustrating actions and communication among various components of a system for provisioning an application on a mobile device.

FIG. 8 is a diagram depicting an example of actions and communication among an operator 805, a server 122, 134, the mobile device 104, 106, and an application 810 needing to be provisioned, for provisioning the application 810. As an initial action, the operator 805 may upload a user list 815 to the server 122, 134. The operator may be, for example, a wireless service provider or another party that has a list of mobile devices that a provisioning message can be sent to. The user list 815 can identify mobile devices by a unique identifier, such as an IMEI of the mobile device or a phone number or unique serial number of the mobile device. The user list 815 can also identify mobile devices by MSISDN, IMSI, or another unique subscription identifier. In one implementation, the user list 815 includes only those mobile devices that include the application needing to be provisioned. In another implementation, the user list 815 includes mobile devices regardless of whether they have the application needing to be provisioned. For example, the user list 815 may include all mobile devices registered on a network of the operator 805. In some implementations, the user list 815 includes mobile devices that have been sent a provisioning message but did not receive the provisioning message, did not respond to the provisioning message, or did not receive provisioning data from the network for another reason. In some implementations, the user list 815 comprises mobile devices that attempted to obtain provisioning data through the routine 500 described above, but were unable to obtain the provisioning data or were otherwise unable to provision the application needing to be provisioned. The operator 805 may record the IMEI of each mobile device that activates on the network 110 and attempts to establish a data channel for communicating the network location represented by the special identifier, but that are unable to. For example, in the GPRS network 200, the SGSN may store error logs that indicate which mobile devices attempted to obtain provisioning data but could not.

The server 122, 134 sends a provisioning message 820, such as a WDP SMS message, to each mobile device of the user list 815. In some implementations, the server 122, 134 provides the operator with the message, and the operator sends the message to mobile devices of the user list instead of the server. When the mobile device 104, 106 receives the provisioning message 820, it activates the application 810 needing to be provisioned. As described above, the provisioning message can include provisioning data, which the mobile device may use to provision the application. The provisioning message can also include instructions for obtaining provisioning data. In some implementations, the provisioning message activates the application 810 but the application includes instructions for obtaining provisioning data.

As described above with respect to the routine 700, when the provisioning message includes provisioning data, the mobile device can provision the application. When the provisioning message 820 does not include provisioning data, the application causes the mobile device to send a request 830 for provisioning data to a network location that has provisioning data, such as the server 122, 134. The network location having provisioning data responds by sending provisioning data 835 to the mobile device, which is used to provision the application 810. After the application has been provisioned, the application can register 840 with the server 122, 134 or another network location that the application utilizes. For example, if the application is a customer care application, it may need to register with systems associated with a customer's billing records so that it can obtain data necessary for providing customer care.

In some implementations, the mobile device is configured to take an action in response to a received message depending on a port that the message is received through. For example, the mobile device can include a lookup table that maps port numbers to actions that the mobile device should take if the mobile device receives a message through a port corresponding to one of the port numbers from the lookup table. A first port number may map to launching a first application stored on the mobile device, a second port number may map to launching a second application, a third port number may map to displaying particular information stored on the mobile device, and so on. If the mobile device receives a message through a port corresponding to the first port number, the mobile device launches the first application. Similarly, if the mobile device receives a message through a port corresponding to the second port number, the mobile device launches the second application. If the mobile device receives a message through a port corresponding to the third port number, the mobile device displays the particular information stored on the phone. In some implementations, a message received through a port corresponding to a port number listed in the lookup table changes the action that is performed by the mobile device as a result of receiving the message through the port. For example, if the mobile device receives a message through the third port, it might display the particular information stored on the mobile device, including supplemental information provided by the message.

In some implementations, the mobile device is configured to take an action in response to receiving an indication that a data channel has been established with a data network depending on a special identifier that was used in requesting to establish the data channel. For example, the mobile device can include a lookup table that maps special identifiers to actions that the mobile device should take if the mobile device is able to establish a data channel with a data network represented by one of the special identifiers. A first special identifier (e.g., a first APN) may map to launching a first application if the network responds affirmatively, a second special identifier may map to displaying particular information stored on the mobile device, and so on. If the mobile device attempts to establish a data channel with a data network represented by the first special identifier and the mobile device receives an indication that the data channel has been established, the mobile device launches the first application. Similarly, if the mobile device attempts to establish a data channel with a data network represented by the second special identifier and the mobile device receives an indication that the data channel has been established, the mobile device displays the particular information stored on the mobile device. The mobile device can attempt to establish data channels with data networks represented by each special identifier of the lookup table simultaneously, successively, or randomly. The mobile device can attempt to establish data channels with data networks represented by each special identifier of the lookup table when the mobile device is powered on, when the mobile device is able to detect a signal from the network, or at another time, such as at times identified above in the description of FIGS. 5 and 6. If the mobile device does not receive an indication that a data channel has been established with a data network represented by a special identifier from the lookup table, the mobile device does not take the action that maps to the special identifier.

CONCLUSION

Although aspects of the invention are described as being implemented in a GPRS network, the invention can also be implemented in other subscription-based data networks. For example, the invention can be implemented in a CDMA network or other telecommunications networks. Additionally, the invention can be implemented in other data networks, including networks utilizing WiMAX, LTE, or any of the IEEE 802.11x protocols.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes, elements or blocks are presented in a given order or arrangement, alternative implementations may perform routines having steps, or employ systems having blocks or elements, in a different order or arrangement, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

The present application incorporates by reference in its entirety the subject matter of U.S. Pat. No. 7,353,016, entitled "Call intercept methods, such as for customer self-support on a mobile device." Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A wireless mobile device configured to communicate wirelessly with a wireless cellular telephone network employing a wireless communications protocol, and configured to activate an application stored on the mobile device after receiving provisioning data from a remote data store over the wireless network, the mobile device comprising:
 a mobile communication component configured to receive provisioning data over the wireless network and from the remote data store; and
 a mobile provisioning component configured to at least initiate execution of the application using the received provisioning data, wherein the mobile provisioning component is configured to at least initiate activation of the application after:
  (i) the mobile communication component provides a request, during initialization of the wireless communications protocol, to establish a data channel with a data network or resource of the data network,
   wherein the request is generated automatically by the mobile communication component of the mobile device;
   wherein the data network or data resource is represented by a predetermined network address, and
   wherein the request to establish the data channel employs the predetermined network address;
  when the wireless network recognizes or accepts the predetermined network address, then the data channel is established under the wireless communications protocol, between the mobile device and the data network or data resource,
   but if the wireless network does not recognize or accept the predetermined network address, then the data channel is not established with the mobile device and the wireless network does not assess a charge to the mobile device;
  the mobile communication component requests that the provisioning data be transferred from the remote data store to the mobile device; and
  the provisioning data is transferred from the remote data store to the mobile device;
  the mobile communication component initiates execution of the application using the received provisioning data; or,
  (ii) the mobile communication component receives a provisioning message from the wireless network, wherein the provisioning message is received at a predetermined port of the mobile device;
   wherein the predetermined port is specified by the application stored on the mobile device;
   wherein the provisioning message includes the provisioning data, and
   wherein the provisioning data is retrieved from the remote data store, or the provisioning message includes instructions for permitting the mobile device to obtain the provisioning data from the remote data store; and
  the mobile communication component initiates execution of the application using the received provisioning data,
   but if the predetermined port is not specified by the application stored on the mobile device, the mobile device does not recognize the provisioning message, the data channel is not established with the mobile device and the wireless network does not assess a charge to the mobile device.

2. The mobile device of claim 1, wherein:
 the wireless network is a GSM or GPRS network;
 the request to establish the data channel corresponds to a request to activate a packet data protocol (PDP) context;
 the predetermined network address corresponds to an access point name (APN) and the APN is specified by the application; and
 the provisioning message is a binary SMS message.

3. The mobile device of claim 1, wherein the mobile communication component is further configured to receive the provisioning message after the mobile communication component sends a request to establish a data channel with a data network identified by the predetermined network address but a data channel is not established.

4. A method of provisioning an application stored in a mobile device, the method performed by a mobile device having a processor, a radio, and a memory, the method comprising:
 sending a request to a network to establish a data channel with a data network during initialization of a wireless communication protocol,
  wherein the request is generated automatically on the mobile device,
  wherein the data network is represented by a predetermined network address,
  wherein the request to establish a data channel with the data network identifies the data network using the predetermined network address and,
  wherein the application specifies the predetermined network address;
 receiving an indication that the data channel has been established,
  wherein the indication signifies that the data network is recognized by the predetermined network address specified by the application, and
  wherein, if no indication is received, no charge is assessed to the mobile device;
 requesting provisioning data from a remote data store;
 receiving provisioning data from the remote data store; and
 provisioning an application using the provisioning data received from the remote data store.

5. The method of claim 4, wherein:
 the network is a GPRS network;
 the request to establish the data channel corresponds to a request to activate a PDP context; and
 the special identifier corresponds to an APN.

6. The of method claim 4, wherein the provisioning data is received at a predetermined port of the mobile device.

7. A network-based system for provisioning applications for multiple mobile devices, the system comprising:
 means for receiving a request generated automatically on a mobile device during initialization of a wireless communications protocol to establish a data channel between the mobile device and a data network resource,
  wherein the data network resource is represented by a predetermined network address, and
  wherein the mobile device identifies the data network resource using the predetermined network address;
 means for establishing a data channel between the mobile device and the data network resource when the predetermined network address corresponds to the data stored in the data storage area,
  wherein, if the predetermined network address does not correspond to the data stored in the data storage area, no data channel is established and no charge is assessed to the mobile device;

means for identifying provisioning data for provisioning the application; and means for providing the identified provisioning data to the mobile device, wherein the provisioning data is for provisioning an application stored or to be stored in the mobile device.

8. The system of claim 7, wherein the request from the mobile device to establish the data channel between the mobile device and the data network resource comprises a request to activate a PDP context, the predetermined network address corresponds to an APN, and the data channel is established with the data network resource when the PDP context is activated.

9. The system of claim 7, wherein the provisioning data comprises configuration settings for the application, and wherein the application is stored on the mobile device before sale of the mobile device.

10. The system of claim 7, wherein the system further comprises means for recording a unique identifier for a mobile device when a mobile device sends a request to establish a data channel identifying the data channel using the unique identifier but a data channel is not established.

11. The system of claim 7, wherein the means for providing comprises means for sending a provisioning message to the mobile device, wherein the provisioning message contains provisioning data or instructions for obtaining the provisioning data.

12. A method to permit communications between a wireless mobile device and a fee-based wireless cellular telephone network without incurring charges for the mobile device, wherein the wireless cellular telephone network employs a wireless communications protocol, the method comprising:

communicating provisioning data to the mobile device over the fee-based wireless cellular telephone network without incurring charges for the mobile device by either:

(i) at the wireless cellular telephone network, receiving at least one request signal, under the wireless communications protocol, to establish a data channel with a data network or resource of the data network, wherein the request signal is generated automatically by the mobile device during initialization of the wireless communications protocol, wherein the data network or data resource is represented by at least one predetermined network address, and wherein the request to establish the data channel includes the predetermined network address;

when the wireless cellular telephone network recognizes or accepts the predetermined network address, then providing to the mobile device an affirmative message, wherein the wireless cellular telephone network does not assess a charge to the mobile device for either the provided affirmative message or the received request signal, and wherein the mobile device, in response to receiving the affirmative message, performs a specific local action on the mobile device based on data stored at the mobile device;

or, (ii) at the wireless cellular telephone network, providing to the mobile device at least one port-specific message addressed to at least one predetermined port of the mobile device;

wherein the mobile device, in response to receiving the port-specific message, performs a specific local action on the mobile device based on data stored at the mobile device.

13. The method of claim 12, wherein the request signal under the wireless communications protocol is for an initial data channel set up message.

14. The method of claim 12, wherein the mobile device, in response to receiving another affirmative message or another port-specific message addressed to another predetermined port, performs another specific local action on the mobile device.

* * * * *